July 26, 1955 G. COPLEN 2,713,719
SHEARS FOR CUTTING TUBULAR SHEET METAL ARTICLES
Filed Aug. 27, 1953
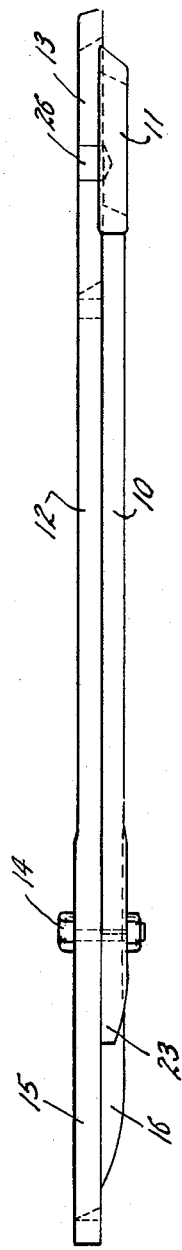
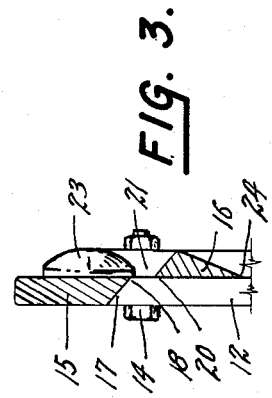
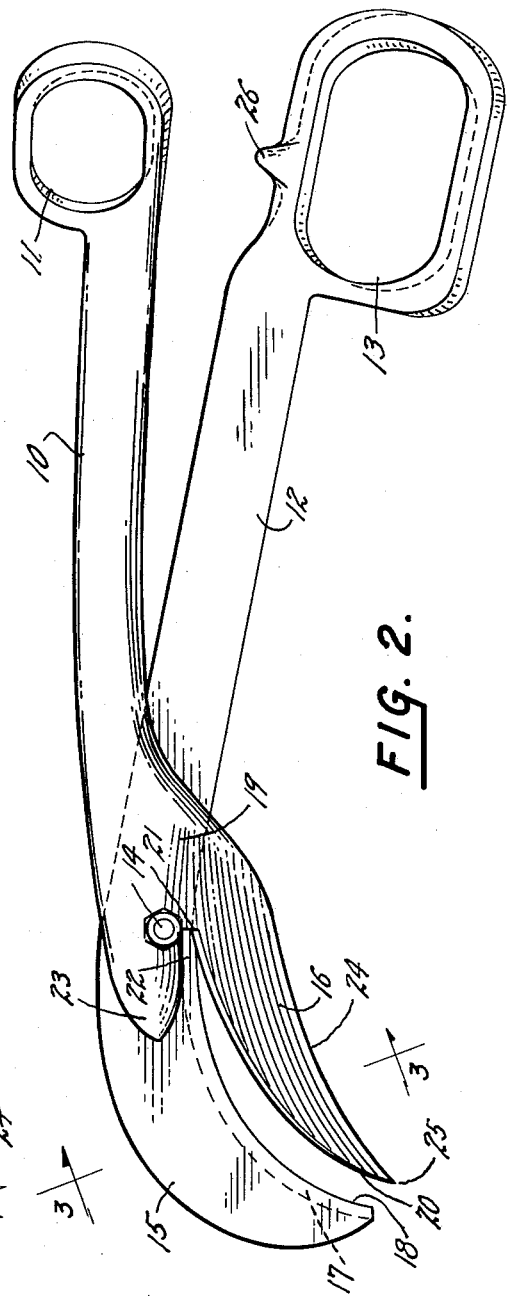
INVENTOR.
GEORGE COPLEN
BY
ATTORNEY

2,713,719

SHEARS FOR CUTTING TUBULAR SHEET METAL ARTICLES

George Coplen, Cripple Creek, Colo.

Application August 27, 1953, Serial No. 376,895

3 Claims. (Cl. 30—254)

This invention relates to sheet metal shears or snips, and more particularly to snips designed for cutting tubular sheet metal articles such as stove pipe, furnace pipe, and the like.

The principal object of the invention is to provide sheet metal snips which will accurately and efficiently cut a tubular sheet metal article without crinkling, wrinkling, or distorting the material.

Another object of the invention is to so construct the snips that they may be easily engaged and started in a tubular sheet metal article intermediate the extremities of the latter, and to so construct the snips that the operator's hand will be protected against injury from the cut edges of the metal and from the blades of the snips.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top edge view of the improved sheet metal cutting snips;

Fig. 2 is a side face view thereof; and

Fig. 3 is a cross-section, taken on the line 3—3, Fig. 2.

The improved snips are provided with an upper handle member 10, having a thumb-receiving loop 11, and a lower handle member 12, having a finger-receiving loop 13. The adjacent surfaces of the two handle members are flat and are in frictional engagement with each other. The two handle members 10 and 12 are hingedly connected together by means of a suitable hinge rivet or bolt 14. A stop projection 26 is formed on the lower finger loop 13 which contacts the upper thumb loop 11 to limit the closing action of the handle members when the cutting action of the blades has been completed. The lower handle member 12 terminates at its forward extremity in an upper shearing blade 15, and the upper handle member 10 terminates forwardly in a lower shearing blade 16.

The upper blade 15 extends forwardly and downwardly from the hinge bolt 14 on an arcuate, hooked, claw-like contour. The upper arcuate edge of the upper blade 15 is relatively wide and flat to provide strength for the blade member. The lower arcuate edge of the blade member 15 is beveled, as indicated at 17, to provide a shear-like cutting edge 18. The upper and lower edges intersect to form a blunt point on the upper blade as illustrated in Fig. 2.

The lower blade 16 is dropped or offset below the forward extremity of the upper handle member 10, the blade being connected to the handle member by means of an offset portion 19 which positions the rearward extremity of the lower shearing blade 16 well below the hinge bolt 14. The lower blade 16 is provided with an upper, arcuate, sharpened, shearing edge 20, the arcuate contour of which corresponds to the arcuate contour of the lower shearing edge 18 of the upper blade 15.

The rearward extremity of the shearing edge 20 is positioned below the axis of the hinge bolt 14 a distance substantially equal to the distance between the axis of the hinge and the shearing edge 18 of the upper blade 15 to form a relatively straight, offset abutment or bottom 21 in a notch 22 positioned above the lower blade 16. The shearing edge 20 extends forwardly and downwardly from the abutment 21, terminating in a relatively sharp point 25.

The upper handle member 10 extends forwardly from the hinge bolt 14 to provide a bluntly pointed protuberance or projection 23 which forms the upper side of the notch 22. It will be noted that the hinge bolt 14 is positioned below the center line of the projection 23 to cause a rocking movement of the latter around hinge bolt 14 in addition to the lever-like tilting movement thereof about hinge bolt 14.

The lower blade 16 has a wedge-shaped, triangular cross-section so as to provide a relatively sharp, lower edge 24 which extends rearwardly on an arc to join the offset portion 19. The two blades 15 and 16 have flat adjacent sides aligned with the flat sides of the handle members and frictionally engage each other.

Let us assume it is desired to sever a length of tubular, sheet metal conduit, such as a stove pipe. The point 25 of the lower blade 16 is positioned on the line to be cut. The upper handle member 10 is then driven forwardly, with the palm of the hand, to cause the point 25 to pierce the sheet metal. The sharp, wedge-like, lower blade 16 is now forced into the metal to be cut, with the flat, inner face of the latter aligning with the cutting line. This positions the arcuate metal of the conduit to be cut between the two arcuate cutting edges 18 and 20 and against the abutment 21.

Now, when the two handle members are forced together, the sheet metal will be lifted by the arcuate lower blade 16 against the arcuate upper blade 15, where it will be sheared along the desired cutting line. After each cut the snips are moved forwardly around the circumference of the pipe or conduit, each forward movement being limited by the uncut metal striking the abutment 21 in the notch 22.

In other types of snips there is a tendency for the lower blade to push the metal upwardly and outwardly beyond the remaining metal. This is cancelled out in the improved snips by the projection 23, which swings downwardly against the cut edge at each opening movement of the handle members so as to straighten and align the cut edge before the next cut is made. The projection 23 also prevents the metal in and adjacent the notch 22 from traveling above the axis of the hinge member 14, where it could be distorted and bent, and where it might injure the operator's hand.

The offset portion 19 is relatively thin so that it will readily pass into and through the cut in the metal.

It is desired to call particular attention to the relatively sharp, curved lower edge 24 on the lower shearing blade 16. This sharp edge allows the lower blade 16 to easily enter between the two separated cut edges of the metal so that the lower blade may freely reciprocate in the cut while the snips are traveling around the circumference of the pipe, without bending or distorting the cut edges.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. Stove pipe snips comprising: an upper handle member; a lower handle member; adjacent flat surfaces formed on said handle members; a hinge member pivotally securing said handle members together adjacent their forward extremities with their flat surfaces in frictional engagement; a forwardly and downwardly hooked, upper blade extending from the lower handle member forwardly of the hinge member; an arcuate shearing edge formed on the lower edge of said upper blade and extending from the forward extremity thereof upwardly and rearwardly to a termination below the axis of said hinge member; a pointed lower blade; an offset portion at the forward end of said upper handle supporting said lower blade below and forwardly of said upper handle member; an upper shearing edge on said lower blade extending upwardly and rearwardly from the point thereof and terminating below the hinge member in spaced relation to the axis of the latter, said upper shearing edge on said lower blade having an arcuate contour substantially corresponding to the arcuate contour of the arcuate shearing edge of said upper blade; and a lower arcuate edge on said lower blade member extending upwardly and rearwardly from the point of the latter to a position below said hinge member.

2. Stove pipe snips as described in claim 1 having adjacent flat surfaces formed on said upper and lower blades, said surfaces forming a continuation of the flat surfaces on said handle members; and a bottom abutment extending upwardly from the rear extremity of the upper shearing edge of said lower blade to a termination below the axis of the hinge member and forming a forward side on said offset portion.

3. Stove pipe snips as described in claim 2 having a forwardly-extending, metal-depressing protuberance formed on the forward extremity of said upper handle member and extending forwardly of said hinge member above the rear extremity of said upper cutting edge of said lower blade and in spaced relation to the latter.

References Cited in the file of this patent

UNITED STATES PATENTS

| | | |
|---|---|---|
| 103,197 | Kellogg | May 17, 1870 |
| 296,036 | Millspaugh | Apr. 1, 1884 |
| 1,274,019 | Dziezyc | July 30, 1918 |
| 2,006,133 | Fowler | June 25, 1935 |